United States Patent [19]
Evans

[11] 3,974,133
[45] Aug. 10, 1976

[54] VINYL CHLORIDE POLYMERIZATION PROCESS

[75] Inventor: Dennis Ernest Mackley Evans, Welwyn Garden City, England

[73] Assignee: Imperial Chemical Industries Limited, London, England

[22] Filed: Jan. 8, 1975

[21] Appl. No.: 539,385

[30] Foreign Application Priority Data
Jan. 23, 1974 United Kingdom............... 3100/74

[52] U.S. Cl............................. 526/344; 526/206; 526/207; 526/208; 526/345
[51] Int. Cl.² ..................... C08F 2/18; C08F 2/26; C08F 14/06
[58] Field of Search ............................. 260/92.8 W

[56] References Cited
UNITED STATES PATENTS
3,324,097    6/1967    Pears............................ 260/92.8 W
3,551,399   12/1970   Yonezu et al................ 260/92.8 W

*Primary Examiner*—John Kight, III
*Attorney, Agent, or Firm*—Cushman, Darby & Cushman

[57] ABSTRACT

A process for the production of vinyl chloride polymers suitable for the production of pastes, in which a mixture of water and a monomer soluble free radical yielding initiator dissolved in a solvent therefor is subjected to homogenization in the presence of a surfactant and mixed with the monomeric material to be polymerized, the monomeric material then being polymerized to form vinyl chloride polymer. None of the vinyl chloride to be polymerized is homogenized in the claimed process.

10 Claims, No Drawings

VINYL CHLORIDE POLYMERIZATION PROCESS

The present invention relates to the polymerisation of vinyl chloride and more particularly to a process of producing vinyl chloride polymers suitable for the production of pastes.

It is known to produce vinyl chloride polymers using a process in which a dispersion of vinyl chloride, or vinyl chloride and a copolymerisable monomer, in the presence of a surfactant, is homogenised by subjecting it to violent shearing action in, e.g. a colloid mill a high speed pump, or an ultrasonic device, and the resulting homogenised dispersion polymerised in a stirred autoclave using a monomer soluble initiator.

The vinyl chloride polymers produced by such a process are composed of very small particles (usually in the range 0.1 to 2 microns) which can be dispersed in plasticisers to form relatively stable dispersions known as pastes. These are useful in a variety of applications such as shaping process, e.g. involving open casting, rotational casting, slush moulding, compression and injection moulding, or in coating processes, e.g. by dipping, spraying or spreading techniques, or in the manufacture of foams.

The particle size distributions of vinyl chloride polymers made using such a homogenised dispersion polymerisation technique are such that pastes made with the polymers possess particularly advantageous properties such as a low initial viscosity and a slow rate of increase in viscosity on ageing.

The conventional homogenised dispersion technique, however, suffers from the drawback that the homogenisation step (1) necessitates the use of expensive, sometimes bulky homogenisation equipment, the available homogenisation capacity limiting the quantity of monomer which can be polymerised during the technique and (2) increases the cycle time of the vinyl chloride polymerisation, resulting in decreased productivity. We have now discovered a process whereby these drawbacks may be considerably reduced.

According to the present invention there is provided a process for the production of a vinyl chloride polymer which comprises polymerising vinyl cloride or vinyl chloride and up to 30% by weight thereof of at least one ethylenically unsaturated monomer copolymerisable therewith, wherein before the commencement of polymerisation a mixture of water and a monomer soluble free radical yielding initiator dissolved in a solvent therefor is homogenised in the presence of an emulsifying agent and/or suspension agent to yield a homogenised dispersion all or part of which is mixed with the monomeric material to be polymerised and optionally further water, the monomeric material then being polymerised to form vinyl chloride polymer.

It is to be understood that the solvent for the initiator is not part of the monomeric material to be polymerised.

Thus in the process of the invention none of the monomer to be polymerised is subjected to homogenisation whereas hitherto, all of the monomer to be polymerised was included in the homogenisation step. In spite of this, the resulting vinyl chloride polymer is, most surprisingly, still in the form of a latex of small particle size which, while not necessarily being exactly equivalent to a conventionally prepared polymer in which all the monomer is homogenised, is nevertheless most interesting as a paste-forming material in the applications mentioned hereinbefore.

It is seen that the process of the invention allows a shorter cycle time per reaction batch to be achieved because of the reduction in the time taken up in the homogenisation step as a result of not subjecting the monomer(s) to be polymerised to homogenisation.

Furthermore, in cases where one homogeniser is used to provide the homogenised charge for a number of reactors in sequence, the process allows any reduction in cycle time achieved by other means to be taken advantage of because of the reduction of the time for which the homogeniser is engaged with any particular reactor. In this way, the time which a reactor could stand idle, e.g. because of a reduction in the time taken to complete the polymerisation/polymer discharge/reactor cleaning sequence, may be diminished or eliminated altogether.

In addition the process of the invention may allow the use of smaller capacity homogenisation equipment and/or allow the use of fewer homogenisers for a given number of reactors.

It may also be possible to use a homogenised dispersion (containing no monomer) made according to the invention as a feedstock for a plurality of polymerisations although more usually the homogenised dispersion serves one polymerisation only.

Even further, the process of the invention avoids the problem of polymer build-up being produced in the pipelines between the homogenisation equipment and the polymerisation reactor.

It is to be understood that the solvent for the free-radical yielding initiator is preferably also a solvent for vinyl chloride and any comonomer being polymerised and moreover is sufficiently insoluble in water to form a discrete phase therein. Such solvents include unsubstituted aliphatic or alicyclic hydrocarbons such as pentane, cyclohexane, or eicosane; substituted, particularly chlorinated, aiphatic or alicyclic hydrocarbons such as methylene chloride, chloroform, carbon tetrachloride and ethylene dichloride; substituted or unsubstituted aromatic compounds such as benzene and substituted benzenes such as chlorobenzene, toluene, anisole, and the xylenes; and ketones such as acetone and methyl ethyl ketone. It is preferable to use a volatile solvent such as methylene chloride, chloroform, ethylene dichloride or acetone so that it can be readily removed from the resulting polymer.

In the process of the invention it is preferable to homogenise all of the water to be used in the polymerisation, although it is within the scope of the invention to homogenise only a fraction of the water to be used, the rest being included with the unhomogenised monomeric material. Thus as low as 10% by weight of the total water charge to be used in the polymerisation may be homogenised with the free radical yielding initiator. However, in cases where only a fraction of the water is homogenised, it is preferred to homogenise at least 20%, particularly at least 35% of the total water charge to be used in the polymerisation.

In the process of the present invention, the total amount of the homogenised dispersion to be used in the polymerisation is usually admixed with the monomeric material to be polymerised (and optionally additional water) before the commencement of polymerisation. However, it is within the scope of the invention to admix only a fraction of the homogenised dispersion to be used in the polymerisation with the monomeric material before the commencement of polymerisation, the remainder being added (e.g. by injection) continuously or discontinuously during the polymerisation. This technique provides interesting types of paste-forming polymers and may, for example, enable the particle size distribution of the polymer to be varied in a controlled and pre-selected manner.

It is to be appreciated that in the process of the invention, homogenisation of the material which is intended for homogenisation should be as thorough and as effective as possible, that is to say it is desirable that every part of the charge intended for homogenisation should in fact be properly and uniformly homogenised. If this is not realised, then the presence of unhomogenised or poorly homogenised material in the homogenised charge may well result in a batch having an unacceptable particle size distribution, e.g. containing pebble-like product and/or build-up or even entirely coagulated.

The possibility of ineffective homogenisation mainly arises because of the so-called "setting up" period of the homogenisation step, by which we mean the initial period during which the charge to be homogenised is passed through the homogeniser and during which the controls of the homogeniser are being "set" to produce the required homogenising power (e.g. where a high speed pump is used as the homogeniser, the settings are the different pressures in the stages of the pump). It is evident that during the setting up period prior to homogenisation proper, the material emerging from the homogeniser is likely to be unhomogenised or poorly homogenised. To overcome this problem, the initially emerging material is recirculated back to the stock of material being passed to the homogeniser.

The period of recirculation necessary to avoid unacceptable product will vary according to the size of the charge being homogenised. In the case of a relatively small charge such as might be used on a laboratory or pilot plant scale, the recirculation time need not be very long since the chances of each part of the un-homogenised or poorly homogenised material being rapidly passed through the homogeniser once more are high in view of the smallness of the charge. On a production scale, however, where a much larger charge to be homogenised is involved, the chances of the initially emerging material again being passed through the homogeniser are not so high, so that a longer recirculation time is required.

It is not possible to quantify generally the necessary recirculation time since this will depend, inter alia, on the particular homogenising apparatus being used, the homogenising power being employed for any particular homogenising apparatus and, as explained above, on the size of the charge being homogenised. In practice, the minimum necessary recirculation time should be determined experimentally for a given polymerisation system by varying the recirculation time until products having acceptable particle size are reproducibly obtained.

To a certain extent, the recirculation time in any given case can be reduced by increasing the amount of emulsifying or suspension agent used, although this expedient is not generally to be relied on or recommended.

In the process of the invention, part of the emulsifier and/or suspension agent to be used during polymerisation, and/or part of the monomer soluble initiator may be included with the unhomogenised monomeric material. Preferably, however, the whole of the emulsifier and/or suspension agent to be used during polymerisation and/or the whole of the monomer soluble initiator is included with the homogenised mixture.

Any suitable emulsifying agent and/or suspension agent may be used in the process of the invention. The emulsifying agents may be anionic, cationic or non-ionic. It is preferred, however, to use anionic emulsifying agents since they are more efficient in stabilising the resultant polymer latex. Examples of anionic agents are the sodium salts of sulphated and sulphonated hydrocarbons and fatty acids such as dioctyl sodium sulphosuccinate, sulphonated diesel oil and sodium lauryl sulphate and the sodium salts of alkyl aryl sulphonates such as sodium dodecyl benzene sulphonate.

Suspension agents which may be used include protective colloids such as cellulose derivatives and partially hydrolysed polyvinyl acetates.

Any suitable monomer soluble initiator or combination of initiators may be used in the process of the invention. Suitable monomer soluble initiators include acyl peroxides, such as lauryl peroxide and acetyl cyclohexyl sulphonyl peroxide, and azo compounds such as azodiisobutyronitrile. Dialkyl peroxy dicarbonates may also be used as described in our United Kingdon patent specification No. 978 875 reference to which is incorporated herein.

In the process of the invention homogenisation may be effected using any suitable apparatus such as those mentioned hereinbefore. It has been found that homogenisation is simply effected and readily controlled by using a high speed pump. A two-stage pump gives very good results.

To produce the homogenised dispersion according to the process of the invention a stirred premix of the water, emulsifier and/or suspension agent, initiator and solvent may, e.g. be formed in a premix vessel and the resulting suspension passed through (with recirculation if necessary) the homogeniser and then into the reactor. The premixing vessel may itself serve as the reactor if appropriately designed for polymerisation reactions. The ingredients may also be passed through the homogeniser into the reactor without a premixing stage, e.g. the initiator being carried in the solvent and the emulsifier and/or suspension agent in the water.

Since the homogenised dispersion is to contain at least part of the polymerisation initiator, the homogenisation is usually effected at a temperature well below that at which polymerisation occurs. In general homogenisation is suitably effected at about ambient temperature or a little above, say 10° to 30°C. Polymerisation is usually effected at a temperature between 40° and 70°C, particularly between 50° and 65°C. The choice of polymerisation temperature is governed to a large extent by the required mechanical properties of the resulting polymer.

On completion of the polymerisation, the polymer may be separated from the water by any suitable drying technique, such as tray drying, drum drying or spray drying.

The present invention is illustrated by the following Examples. All parts and percentages are by weight.

Example 1 is a control in which the total amount of monomeric material used in the polymerisation is homogenised.

Examples 2 and 3 are according to the invention where none of the monomeric material to be polymerised is homogenised.

EXAMPLE 1

2000 g of water, 1600 g of vinyl chloride, 53 g of sodium dodecyl benzene sulphonate, 4.8 g of lauroyl peroxide and 1.2 g of dicetyl peroxydicarbonate were added to a stainless steel reaction vessel (serving also as a pre-mix vessel) from which most of the atmospheric oxygen had been removed by evacuation and purging with nitrogen. The mixture was stirred for 15 minutes to give a course dispersion of the vinyl chloride in water. This mixture was then circulated through a two-stage high speed pump homogeniser (circulation time about 10 minutes) back into the reaction vessel, the pressure of the first stage being 3000 p.s.i. (20685 kN/m$^2$) and of the second stage 500 p.s.i. (3448 kN/m$^2$).

The reaction vessel was heated to 50°C with stirring and the temperature maintained constant at 50°C for the duration of the polymerisation. After 8 hours the pressure in the reaction vessel began to drop and after a further 3 hours polymerisation, the remaining pressure was released.

The product was in the form of a latex (32.3% solids content) and had a median particle size of 0.14 μ.

EXAMPLE 2

2000 g of water, 100 g of ethylene dichloride, 53 g of sodium dodecyl benzene sulphonate, 4.8 g of lauroyl peroxide, 1.2 g dicetyl peroxydicarbonate were added to a stainless steel vessel (serving also as a pre-mix vessel) from which most of the atmospheric oxygen had been removed by evacuation and purging with nitrogen. The mixture was stirred for 15 minutes to give a coarse dispersion of ethylene dichloride in water. This mixture was circulated through a two-stage high-speed pump homogeniser (circulation time about 10 minutes) back into the reaction vessel, the pressure of the first stage being 3000 p.s.i. and the second stage 500 p.s.i. 1600 g of vinyl chloride were then injected into the reaction vessel containing the homogenised dispersion.

Polymerisation was then carried out at 50°C as for Example 1, the time taken for the pressure to begin to drop being 8 hours.

The product was in the form of a latex (solids content 41.0%) and had a median particle size of 0.17 μ.

EXAMPLE 3 AND 4

The procedure of Example 2 was repeated except that the ethylene dichloride was replaced with 100 g methylene dichloride (Example 3) and 100 g xylene (Example 4). Similar products were obtained.

I claim:

1. A process for the production of a vinyl chloride polymer which process comprises polymerising vinyl chloride or vinyl chloride and up to 30% by weight thereof of at least one ethylenically unsaturated monomer copolymerisable therewith, wherein before the commencement of polymerisation a mixture of water and a monomer soluble free radical yielding initiator dissolved in a solvent therefor is homogenised in the presence of an emulsifying agent and/or suspension agent to yield a homogenised dispersion all or part of which is mixed with the monomeric material to be polymerised and optionally further water, the monomeric material then being polymerised to form the vinyl chloride polymer.

2. A process according to claim 1 wherein all of the water to be used in the polymerisation is homogenised.

3. A process according to claim 1 wherein a fraction of the water to be used in the polymerisation is homogenised.

4. A process according to claim 1 wherein the solvent for the initiator is soluble in the monomeric material to be polymerised and forms a discrete phase in water.

5. A process according to claim 1 wherein the solvent for the initiator is selected from unsubstituted aliphatic or alicyclic hydrocarbons, chlorinated aliphatic or alicyclic hydrocarbons, substituted or unsubstituted aromatic hydrocarbons and ketones.

6. A process according to claim 1 wherein the total amount of the homogenised dispersion to be used in the polymerisation is mixed with the monomeric material to be polymerised before the start of polymerisation.

7. A process according to claim 1 wherein the total amount of the emulsifying agent and/or suspension agent to be used in the polymerisation is subjected to homogenisation.

8. A process according to claim 1 wherein the emulsifying agent used is anionic.

9. A process according to claim 1 wherein the total amount of the monomer soluble initiator to be used in the polymerisation is subjected to homogenisation.

10. A process according to claim 1 wherein the mixture which is homogenised is used as a feedstock for a plurality of polymerisations.

* * * * *